United States Patent [19]
Tickoo

[11] Patent Number: 6,041,987
[45] Date of Patent: Mar. 28, 2000

[54] SELF ADJUSTING CARGO ORGANIZER FOR VEHICLES

[76] Inventor: Sham L. Tickoo, 525 St. Andrews Dr., Schererville, Ind. 46375

[21] Appl. No.: 09/076,060

[22] Filed: May 11, 1998

[51] Int. Cl.⁷ .................................. B60R 7/02; B60R 7/08
[52] U.S. Cl. .............................. 224/542; 220/8; 224/551
[58] Field of Search ........................ 220/8, 9.2; 224/539, 224/542, 543, 550, 551, 403, 925; 211/105.3, 105.5, 12, 184, 85.15; 410/149; 296/37.1; 256/67

[56] References Cited

U.S. PATENT DOCUMENTS

| | | | |
|---|---|---|---|
| 3,799,228 | 3/1974 | Crawford | 220/9.2 X |
| 4,684,087 | 8/1987 | Spickard | 224/539 X |
| 4,746,041 | 5/1988 | Cook | 224/485 |
| 5,469,999 | 11/1995 | Phirippidis | 224/542 |
| 5,520,316 | 5/1996 | Chen | 224/539 |
| 5,713,502 | 2/1998 | Dixon | 224/539 X |

*Primary Examiner*—Allan N. Shoap
*Assistant Examiner*—Joe Merek

[57] ABSTRACT

A cargo organizer for the trunk of a vehicle. The device consists of a tubular fame work which is telescopically adjustable and held in position by a pressuring device located inside the tubular members of the framework. Divider plates are located on the framework for dividing the available space in the organizer. The plates may be moved or positioned anywhere along the straight portion of the tubular members.

1 Claim, 10 Drawing Sheets

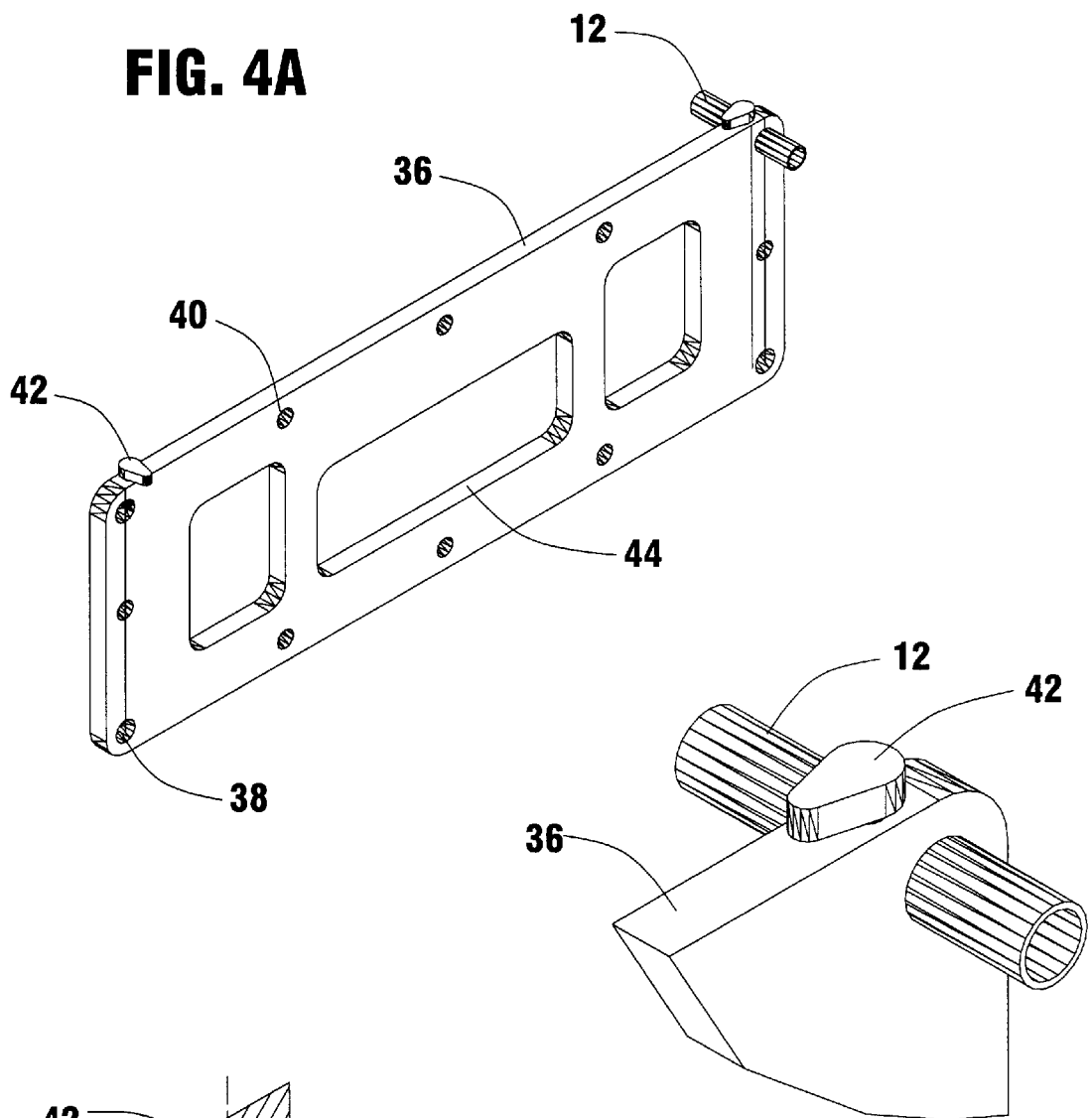
FIG. 4A
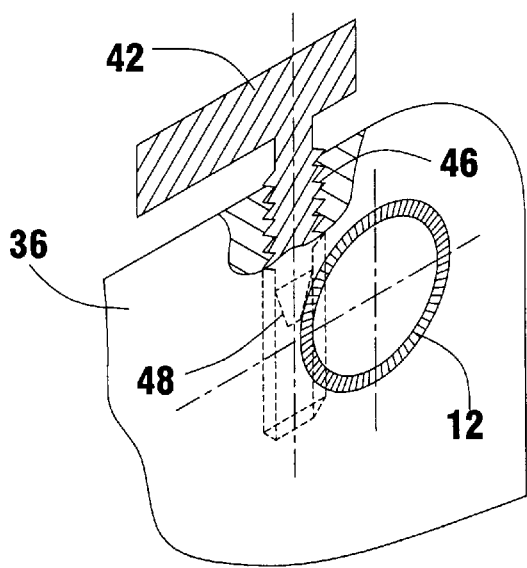
FIG. 4B
FIG. 4C

SELF ADJUSTING CARGO ORGANIZER FOR VEHICLES

BACKGROUND OF THE INVENTION

1. Field of the Invention

This invention relates to a cargo organizer that can be used to hold and organize the cargo in a vehicle.

2. Summary of the Prior Art

When carrying cargo, it is generally placed in the trunk or the cargo area of a vehicle. If the trunk space is not full, the cargo will shift in transit, thereby spilling cargo in the trunk. The prior art discloses various devices for organizing or holding the cargo in the trunk of a vehicle, but none provides the ability of convenient use and automatic adjustment of the device. U.S. Pat. No. 4,684,087 to Spickard (1987) discloses a grocery bag holder that is not adjustable and is cumbersome to assemble and use. U.S. Pat. No. 5,129,612 to Beaupre (1991) discloses a collapsible stand for stabilizing the grocery bags in transit that uses the ribs in the base plate to prevent it from slipping. The ribs do not provide sufficient support to hold the device and the cargo in place. U.S. Pat. No. 5,161,700 to Stannis discloses an adjustable storage system for a vehicle that requires manual adjustment and is too expensive to manufacture. Furthermore, the prior art devices are either heavy, expensive in construction, or lack in aesthetic appeal. In addition to the patents discussed above, the following is the list of the prior U.S. patents known to the applicant:

Schoeny, U.S. Pat. No. 4,718,584; Jan. 12, 1988
Roberts, U.S. Pat. No. 4,029,244; June, 14 1977
Dottor, U.S. Pat. No. 4,226,348; Oct. 7, 1980
Richardson, U.S. Pat. No. 3,800,990; Jan. 17, 1972
November, U.S. Pat. No. 3,986,656; Oct. 3, 1976
Bott, U.S. Pat. No. 4,303,367; Dec. 1, 1981
Herlitz, U.S. Pat. No. 4,540,213; Sep. 10, 1985
Haydock, U.S. Pat. No. 4,838,745; Jun. 13, 1989
Geeves, U.S. Pat. No. 4,884,733; Dec. 5, 1989
Majewski, U.S. Pat. No. 4,189,056; Feb. 19, 1980
Cook, U.S. Pat. No. 4,746,041; May 24, 1988
Malinowski, U.S. Pat. No. 5,484,091; Jan. 16, 1996
Phirippidis, U.S. Pat. No. 5,469,999; Nov. 28, 1995
Haase, U.S. Pat. No. 5,505,358; Apr. 9, 1996
Leek, U.S. Pat. No. 4,832,242; May 23, 1989
Cesena, U.S. Pat. No. 5,054,864; Oct. 8, 1991
Frazier, U.S. Pat. No. 5,526,972; Jun. 18, 1996
Khoury, U.S. Pat. No. 5,052,580; Oct. 1, 1990
Shea, U.S. Pat. No. 5,031,769; Jul. 16, 1991
Caruso, U.S. Pat. No. 5,392,972; Feb. 28, 1995
Kristinsson, U.S. Pat. No. 5,234,116; Aug. 10, 1993
Chen, U.S. Pat. No. 5,520,316; May 28, 1996

SUMMARY OF THE OBJECTS AND ADVANTAGES OF THE INVENTION

The following are the objects and advantages of the present invention:

1. The device provides a mechanism that allows the organizer to automatically adjust and snug fit in the opening available in the trunk of a vehicle.
2. The device provides and maintains a constant pressure against the sides of the trunk that makes the device very stable.
3. The device can fit in the trunk in longitudinal, transverse, or diagonal directions.
4. The device does not require any assembly and is easy to use.
5. The device can be easily placed or removed from the trunk or the cargo holding area of a vehicle.
6. The dividers in the device are adjustable that allow the user to customize the space in the organizer.
7. The self-adjusting tray in the device provides additional support to the cargo and prevents the loose items spilling in the trunk.
8. The device can be used with or without the tray.
9. The modified design of the device can be used in vehicles with small trunk space.
10. The device is light, durable, economical in construction, and aesthetically pleasing.

Additional objects and advantages of this invention will become apparent from a consideration of the ensuing drawings and their description.

BRIEF DESCRIPTION OF THE DRAWINGS

FIGS. 4A to 4C show the perspective views of the divider-plate with the exploded detail and a section view.

Figure 1:
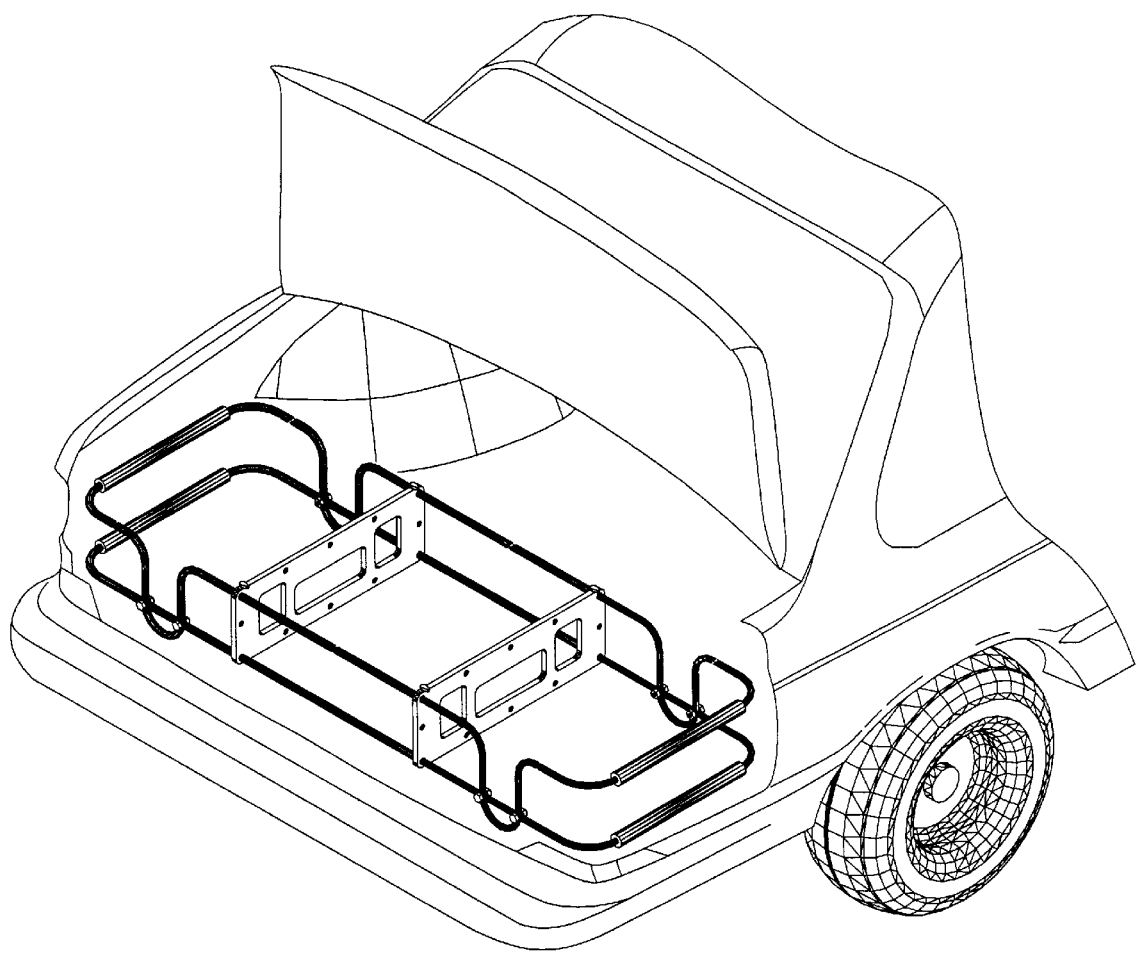
FIG. 1 shows a perspective view of the device and the trunk of a vehicle. The device has been shown positioned in the trunk.

Reference Numerals in the Drawing 10 outer tube
12 inner tube
14 vertical bend
16 horizontal bend
18 spring
20 outer supporting tube
22 inner supporting tube
24 hole in the tubes
26 rubber sleeve
28 notch in the outer tube
30 notch in the outer supporting tube
32 screw
34 nut -continued Reference Numerals in the Drawing 36 divider-plate
38 holes for the tube
40 holes for ties
42 knob
44 pocket for holding the plate
46 threaded hole
48 taper
50 outer tube
52 inner tube
54 outer supporting tube
56 inner supporting tube
58 outer tray
60 inner tray
62 pocket
64 circular slot
66 round extrusion
68 spring
70 positioning guide
72 round groove
74 wire-divider
76 direction of vertical downward force
78 direction of vertical upward force
80 loop

DESCRIPTION OF THE PREFERRED EMBODIMENTS

Description—FIGS. 1–4C

Figure 2A:
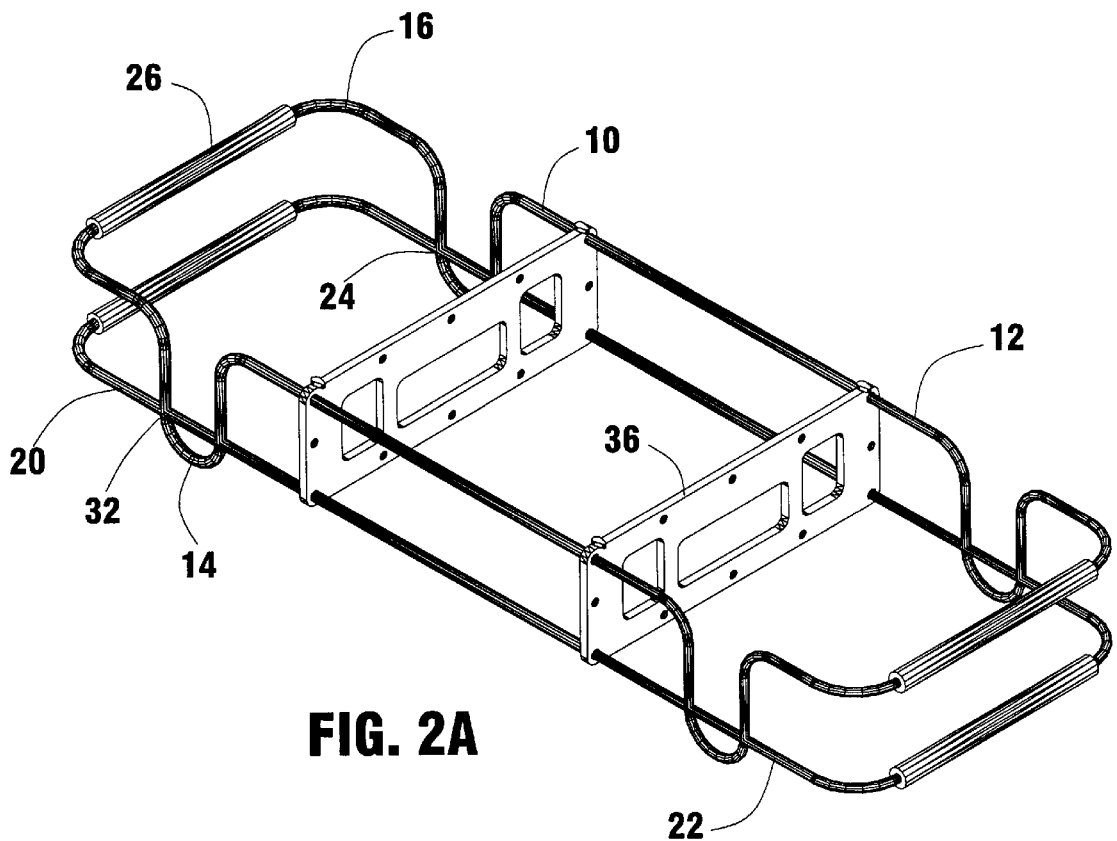
FIG. 2A and 2B show a perspective view of the device and the exploded detail of the area where the outer support tube intersects with the vertical bend in the outer tube.
Figure 2B:
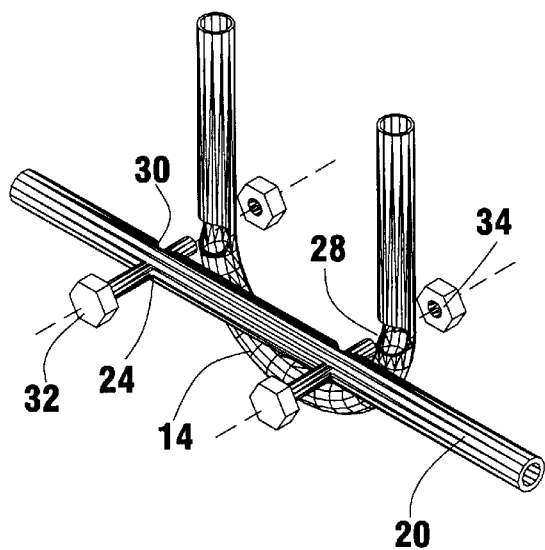
Figure 3A:
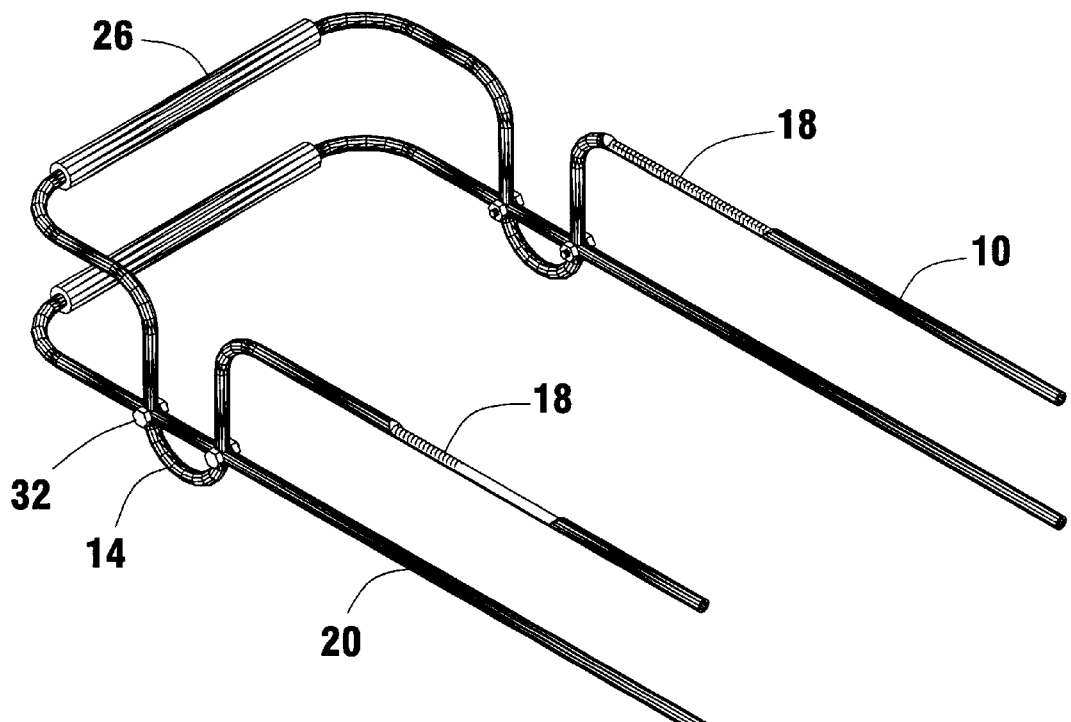
FIGS. 3A and 3B show the perspective views of the outer and inner tubular members with springs mounted in the outer tube.
Figure 3B:
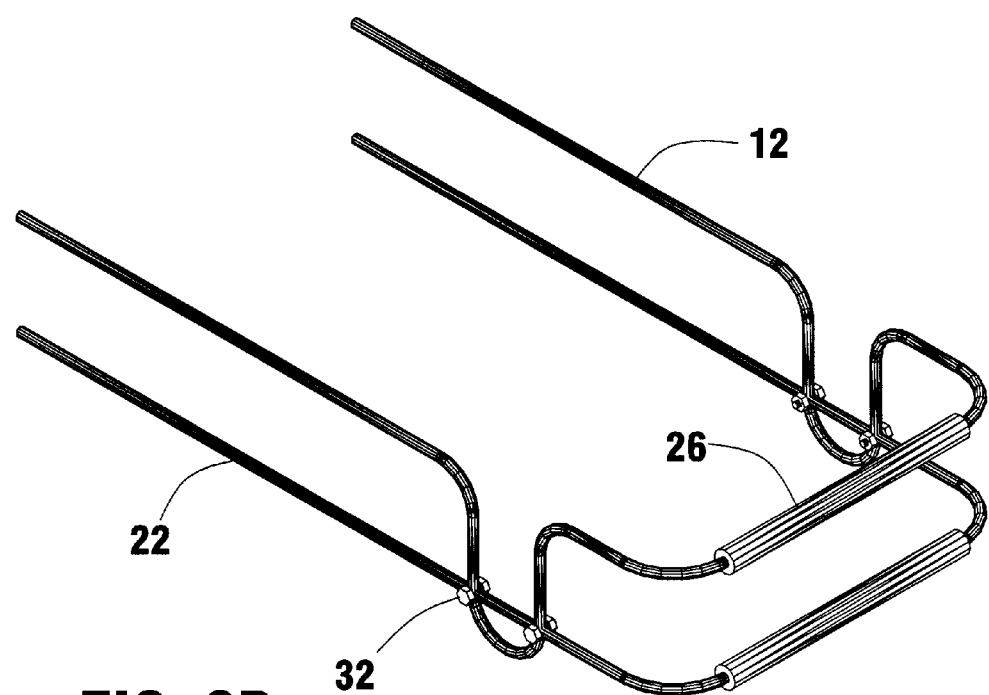

The device shown in FIG. 2A is the typical embodiment of the present invention. The organizer consists of two main tubular members, outer tube 10 and inner tube 12. These tubes are bent vertically forming loops 14 (FIG. 2A) on both sides to provide height to the organizer. Each loop comprises two downwardly extending leg portions connected at the bottom of the loop. Also, the tubes are bent horizontally at 16 on both sides to determine the width of the organizer. The diameter of the inner tube 12 is such that it slides telescopically inside the outer tube 10 forming a generally rectangular framework. The outer tube 10 has two springs 18 (FIG. 3A) mounted inside the tube so that it exerts pressure on the inner tube. This pressure forces the outer tube 10 and the inner tube 12 to extend outwards along the length of the tubular members. The device has two supporting tubes; outer supporting tube 20 and the inner supporting tube 22. These tubes are bent horizontally on both sides. The diameter of the inner supporting tube 22 is such that it slides in the outer supporting tube 20. A notch 28 (FIG. 2B) is cut in the outer tube 10 and a similar notch 30 is cut in the outer supporting tube at the point were they intersect. Holes 24 (FIG. 2B) are drilled through the tubes at the intersecting points and screws 32 and nuts 34 holds the tubes in position. Similar notches are cut at other points where the tubes intersect. A rubber sleeve 26 is mounted on the sides of the device to provide better contact between the device and the sides of the trunk.

FIG. 4A shows a plate 36 that divides the available space in the organizer. The plates can be moved and positioned anywhere along the straight portion of the tubes. The plate has four holes 38 drilled near each corner. The position and diameter of the holes is such that the plate slides on the tubes 10 and 12. At the top of the plate are two threaded holes 46 (FIG. 4C). The knob 42, that is also threaded, fits in these holes. The bottom end of the knob is tapered so that the side of the taper 48 rests against the outer surface of the tube, exerting pressure on the tube 10 or 12 at an angle. The pockets 44 are provided so that the plate can be gripped. The small holes 40 can be used to connect the rubber ties.

Figure 5A:
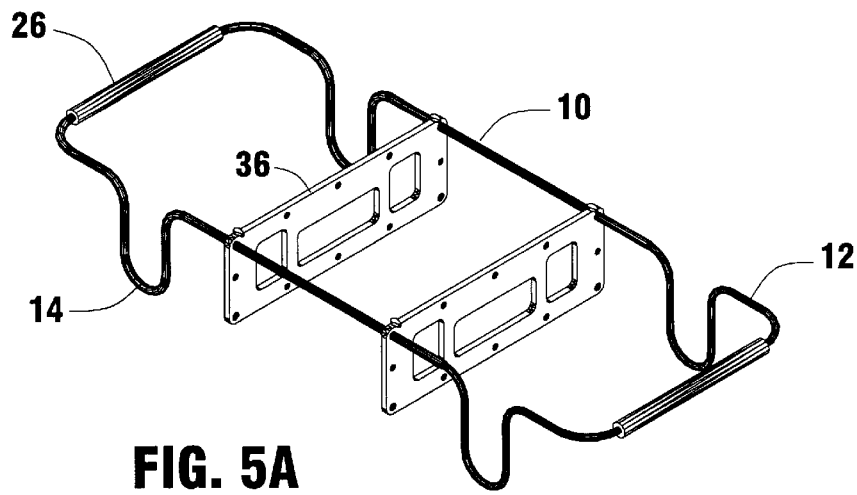
FIGS. 5A to 5C show the perspective views of another embodiment of the invention that consists of two tubular members and divider-plates.
Figure 5B:
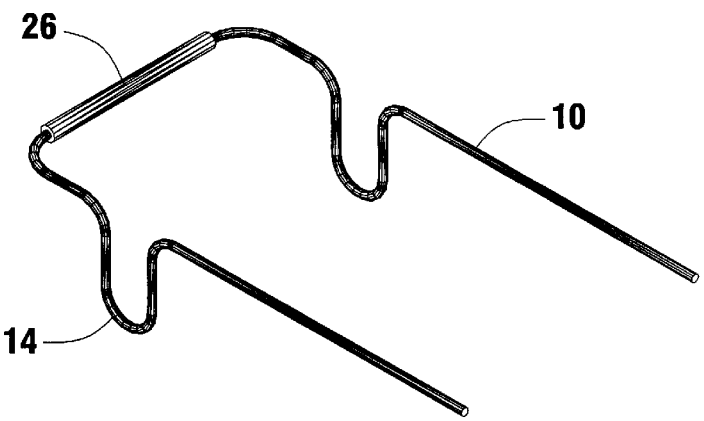
Figure 5C:
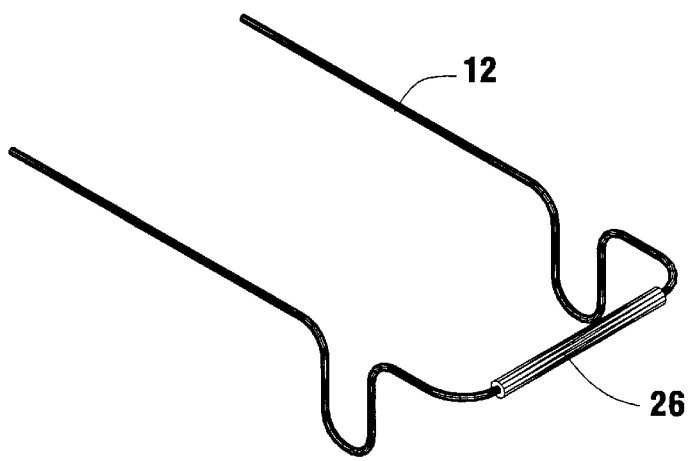

Description—FIGS. 5A–5C

Another embodiment of the invention is shown in FIG. 5A. It consists of two tubes 10 and 12. As shown, it is similar to the organizer discussed earlier, except it does not have the support tubes, holes, and notches to mount the supporting tubular members.

Figure 6:
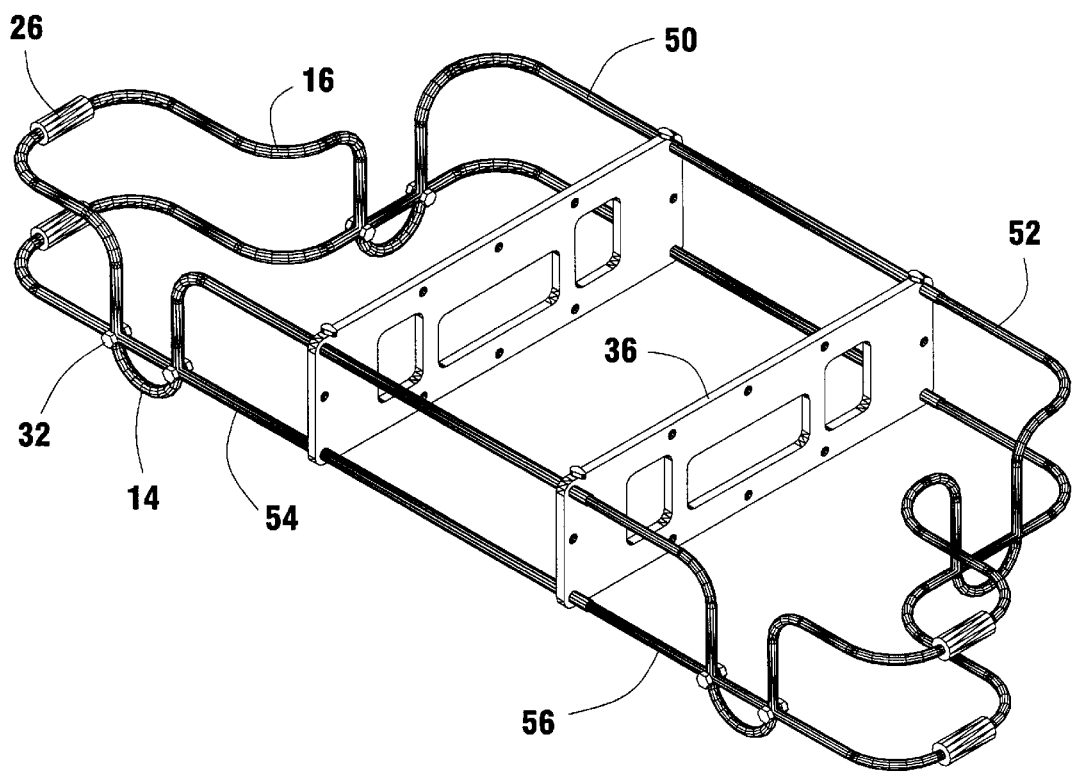
FIG. 6 shows a perspective view of another embodiment of the invention that consists of four tubular members, and divider-plates.
Figure 7A:
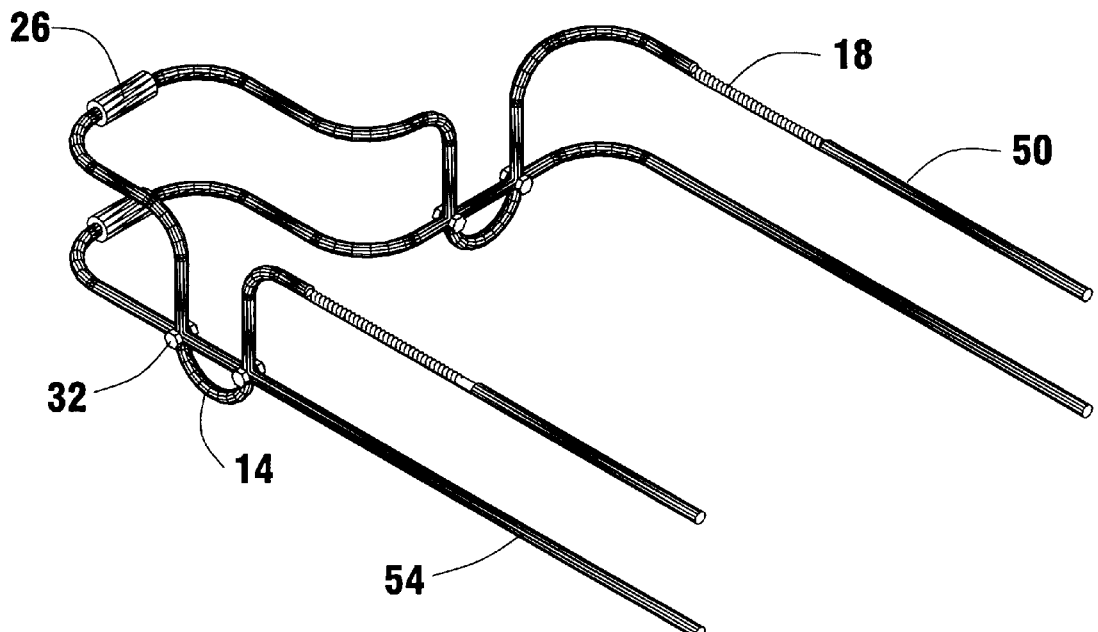
FIGS. 7A and 7B show the perspective view of the outer and inner tubular members with the springs mounted in the outer tube.
Figure 7B:
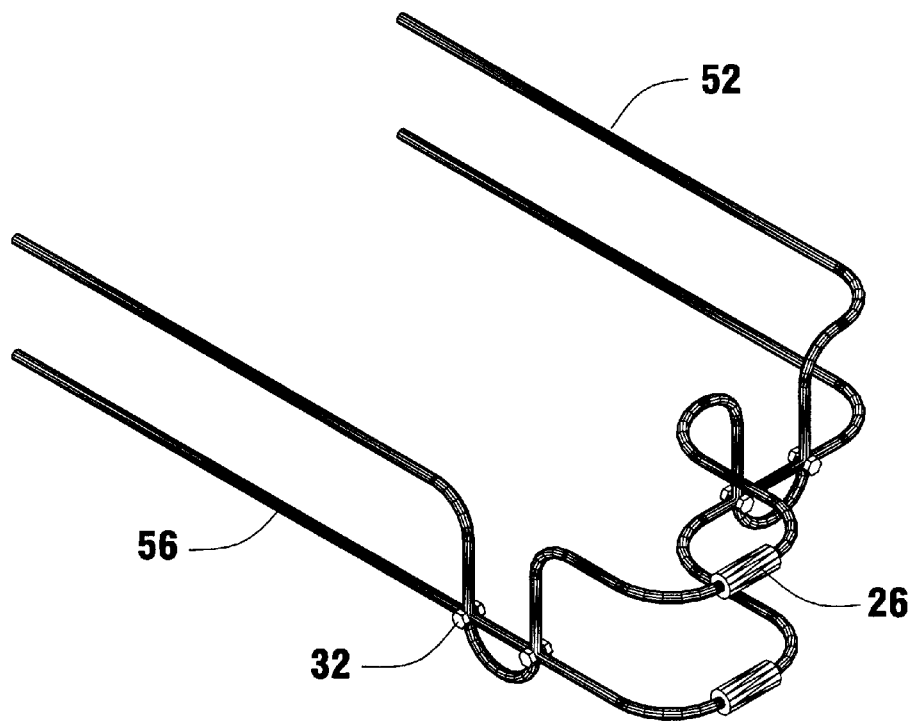

Description—FIGS. 6–7B

Another embodiment of the invention is shown in FIG. 6. In this device the width of the organizer that engages with the sides of the trunk is smaller than the organizer shown in FIG. 2. The length of the organizer at the back is smaller than the length in the front. These features enable the organizer to fit in smaller trunks. It consists of two tubular members 50 and 52 that are bent horizontally 16 (FIG. 6) and vertically 14 to form an enclosure. The supporting tubes 54, 56 are bent horizontally and mounted as shown in FIG. 6. The outer tube 50 has two springs 18 (FIG. 7A) mounted inside the tube so that it exerts pressure on the inner tube. This pressure forces the outer tube 50 and the inner tube 52 to extend outwards along the length of the tubular members. The divider plates 36, vertical and horizontal bends 14, 16, rubber sleeve 26, the notches 28, 30 (FIG. 2B), and screws and nuts 32, 34 stay the same as described earlier.

Description—FIGS. 8A–10B

Figure 8A:
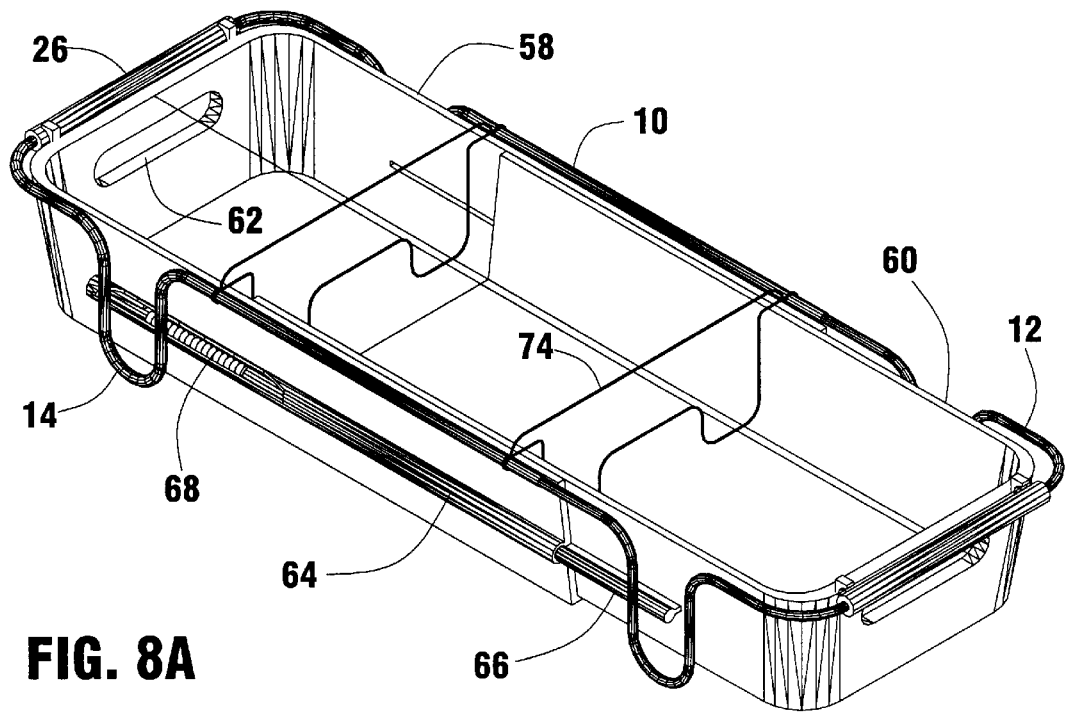
FIGS. 8A and 8B show the perspective views of the self-adjusting tray with and without the tubular frame.
Figure 8B:
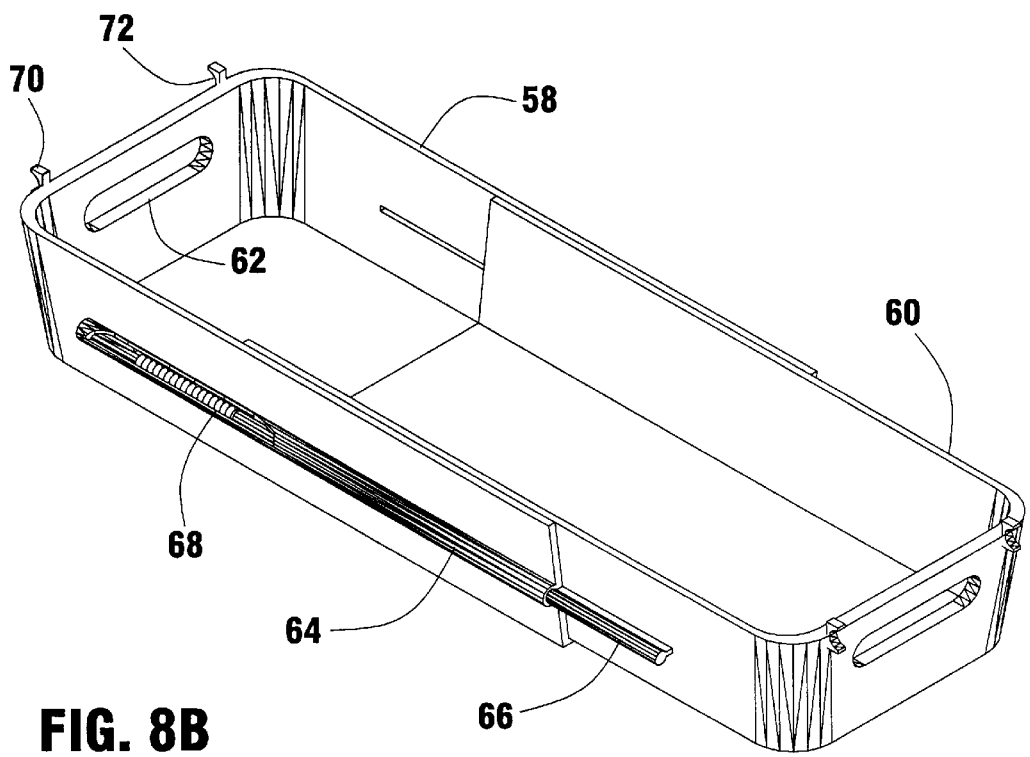
Figure 9A:
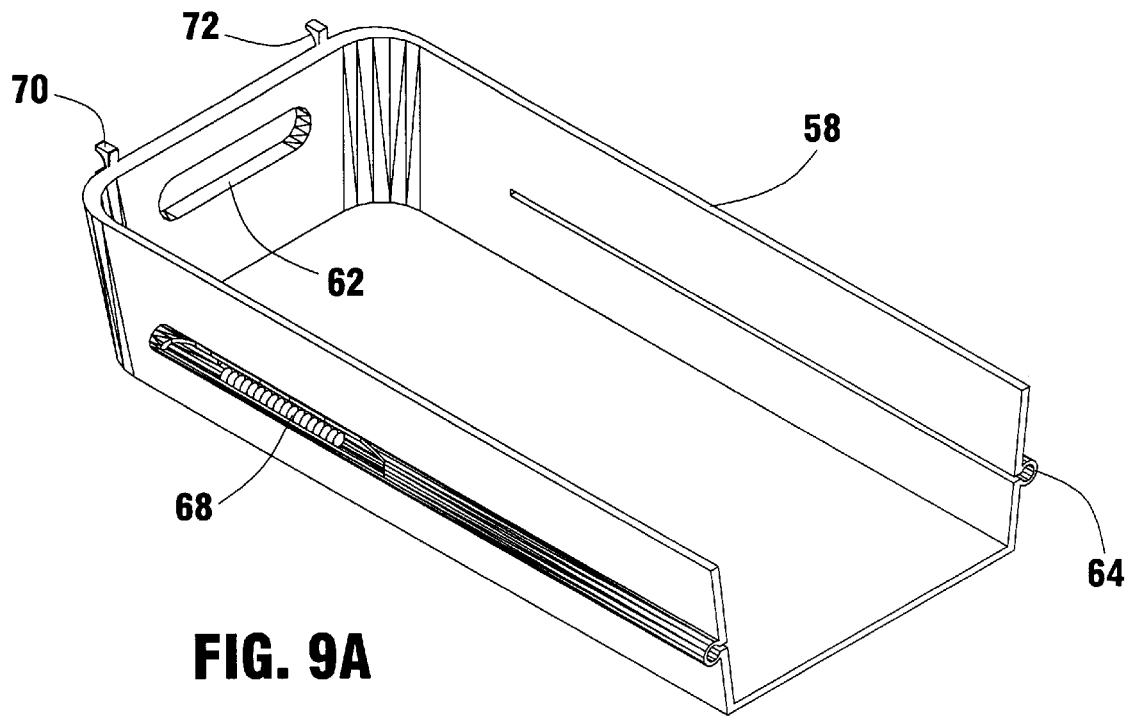
FIGS. 9A and 9B show the perspective views of the two parts of the tray.
Figure 9B:
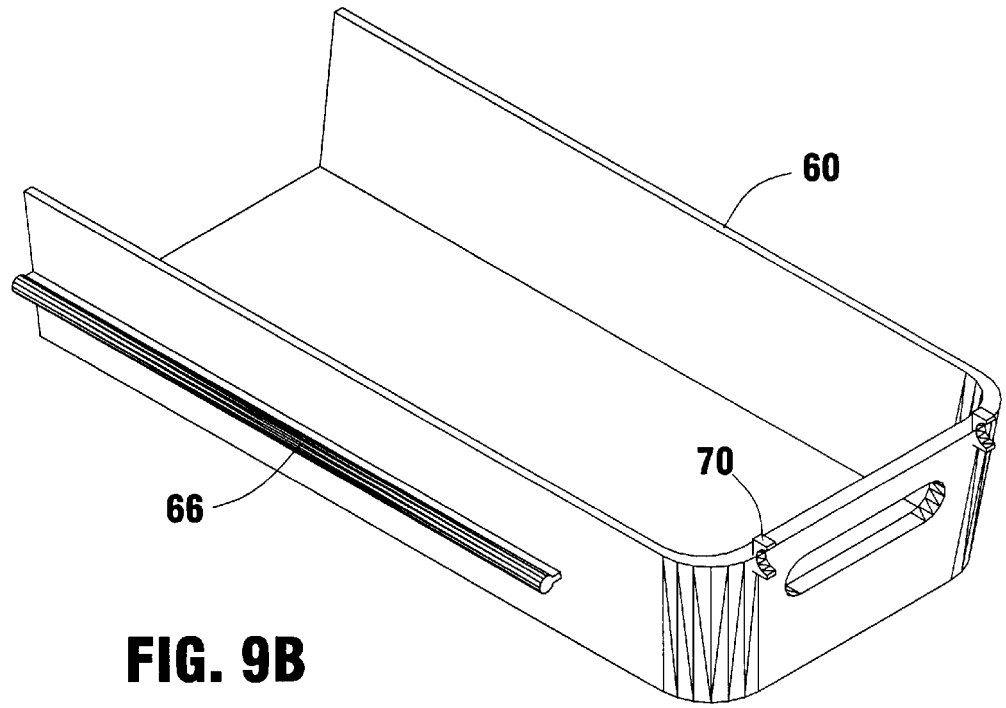
Figure 10A:
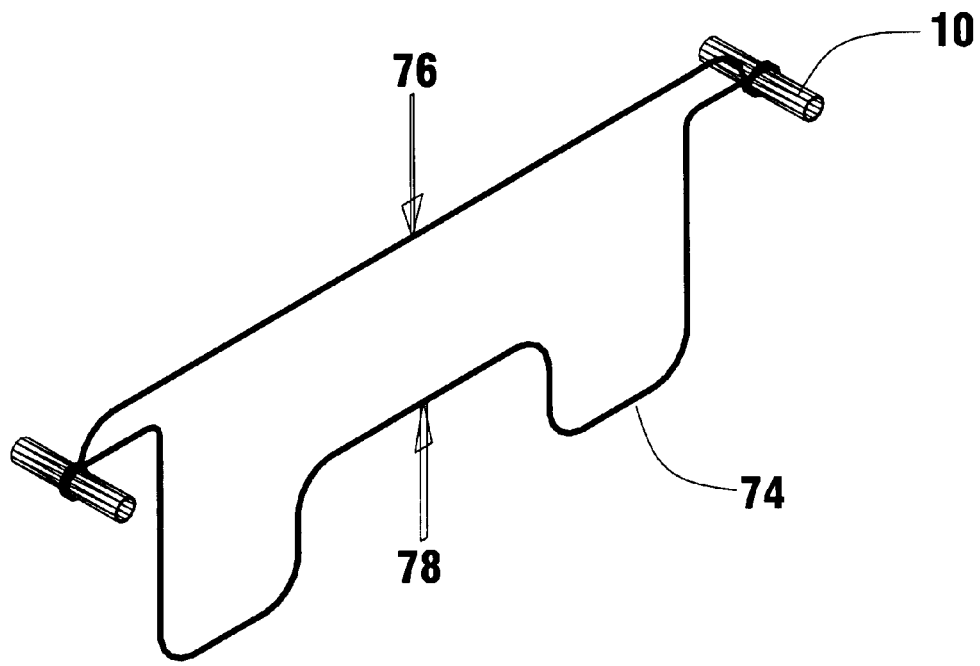
FIGS. 10A and 10B show the perspective views of the wire-divider with the exploded detail.
Figure 10B:
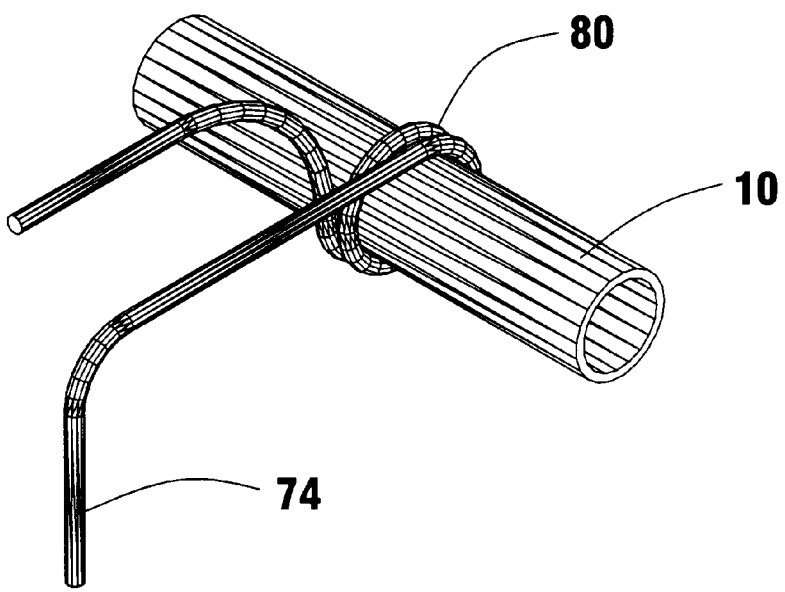

Another embodiment of the invention is shown in FIG. 8A. It consists of a tubular frame and two trays, the outer tray 58 and the inner tray 60. The inner tray 60 slides inside the outer tray 58 along the length of the tray. The outer tray 58 has a circular slot 64 on the sidewalls and the inner tray has a round extrusion 66. The diameter of the round extrusion 66 is such that it slides inside and along the slot 64. Springs 68 are mounted inside the slot on both sides. These springs exert outward pressure on the trays so that they rest against the tubular members. The pockets 62 are cut to allow easy handling of the trays. The space in the organizer is adjusted with the wire-dividers 74 that slide along the tubes and can be positioned anywhere in the tray. The positioning guide 70 (FIG. 8B) and the round groove 72 cut in it aligns the trays with the tube. The wire divider 74 loops around the tubes (FIG. 10B) and is bent as shown in FIG. 10A. The tension in the spring and the frictional force between the wire at the loops and the tube provides the grip that prevents the divider from moving sideways. To loosen the grip, force is applied inwards 76, 78 in the direction of arrows, between the top and bottom wire. This force tends to unwind the loop 80, therefore loosening the grip.

From the foregoing description it will be seen that the invention is one that is well adapted to attain all the ends and objectives hereinbefore set forth together with other advantages which are obvious and inherent in the structures. It will be understood that certain features and sub-combinations are of utility and may be employed without reference to other features and sub-combinations. This is contemplated by and is within the scope of the appended claims. In as many possible embodiments of the invention may be made without departing from the scope thereof, it is to be understood that all matter herein set forth or shown in the accompanying drawings is to be interpreted as illustrative and not in a limiting sense.

Operation

To place the organizer in the cargo space, like the trunk of a car, hold the device by the sides where the rubber sleeves 26 have been mounted and then press the two sliding members 10 and 12 inside along the direction of the tubes. This shortens the length of the organizer. Now, place the organizer in the trunk and release it slowly till the rubber sleeves 26 touch the sides of the trunk enclosure (FIG. 1). To adjust the partitions, loosen the knobs 42 by turning them counter-clockwise and then move the plates 36 sideways. Turn the knob 42 in clockwise direction to lock the plates 36 in position. To remove the organizer from the trunk, hold the organizer by its sides and press it inwards in order to shorten the length of the organizer and then remove it from the trunk enclosure.

If the organizer is used with the trays 58 and 60, the organizer is placed or removed from the trunk as discussed in the previous section. However, to adjust the partitions, hold the top and bottom of the wire divider 74 with the hand and apply force vertically 76, 78 by gripping the wires. The force unwinds the loops 80 and loosens the grip between the wire loops and the tube. Move the wire divider 74 sideways and release it. The tension in the wire loop automatically locks the divider in position.

Conclusion

From the description, it is evident that the invention provides a self-adjusting, economical, convenient, stable, and aesthetically pleasing cargo organizer for a vehicle of any size. Furthermore, the organizer has additional advantages in that the organizer automatically expands to fit in the cargo enclosure. If the organizer includes the trays, they will automatically adjust and stay snug fit in the tubular frame. Also, the tray can be used with or without the tubular frame.

the organizer is stable because the pressuring mechanism provides sufficient force against the walls of the enclosure that prevents it from sliding or becoming loose even when the vehicle starts, stops, or makes a turn.

the plate or wire dividers can be adjusted to customize the space in the organizer.

What is claimed is:

1. A self-adjusting cargo organizer for an automobile for maintaining cargo in position when subjected to sudden movements during the operation of the vehicle in which the cargo is transported, comprising:

a plurality of tubular members interconnected end to end, adjacent members being telescoping with respect to each other, a pressuring device being located between adjacent telescoping members so as to force the members outward along their lengths, said tubular members being formed as a generally rectangular framework having two opposing sides and two opposing ends, a side having a pair of downwardly extending loops such that said framework has depth, each loop comprising two downwardly extending leg portions connected at the bottom of the leg portions, two additional loops being disposed about the remaining framework, said opposing ends each having a sleeve disposed around a portion of said tubular framework, at least one vertically disposed plate extending transversely from one side to the other of said framework to form compartments within said framework, said plate being slidably connected to the respective sides of said framework.

* * * * *